(12) United States Patent
Zhao et al.

(10) Patent No.: US 9,324,979 B2
(45) Date of Patent: Apr. 26, 2016

(54) SLIDABLE BATTERY DOOR ASSEMBLY

(75) Inventors: Kelong Zhao, Shenzhen (CN);
Xianming Huang, Shenzhen (CN);
Curtis Douglas Aumiller, Woodinville, WA (US); Zhiwei Zhang, Singapore (SG); Minggang Ma, Shenzhen (CN);
Luke M. Murphy, Redmond, WA (US);
Peter W. Bristol, Seattle, WA (US);
Jared I. Drinkwater, Auburn, WA (US);
David M. Lane, Sammamish, WA (US);
Summer L. Schneider, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 932 days.

(21) Appl. No.: 13/427,246

(22) Filed: Mar. 22, 2012

(65) Prior Publication Data

US 2013/0252057 A1  Sep. 26, 2013

(51) Int. Cl.
*H01M 2/10* (2006.01)
(52) U.S. Cl.
CPC ........ *H01M 2/1022* (2013.01); *H01M 2220/30* (2013.01)
(58) Field of Classification Search
CPC .................. H01M 2/1022; H01M 2220/30
USPC .............................................. 429/97
See application file for complete search history.

(56) References Cited

U.S. PATENT DOCUMENTS

| | | | |
|---|---|---|---|
| 4,371,594 A | 2/1983 | Ohara et al. | |
| 4,880,712 A | 11/1989 | Gordecki | |
| 5,007,859 A * | 4/1991 | Sangregory et al. | 439/500 |
| 5,270,702 A | 12/1993 | Krolak | |
| 6,293,463 B1 | 9/2001 | Kato et al. | |
| 6,428,924 B1 | 8/2002 | Suganuma et al. | |
| 2002/0162231 A1* | 11/2002 | Foreman | 33/203.18 |
| 2008/0063926 A1 | 3/2008 | Huang et al. | |
| 2009/0084040 A1 | 4/2009 | Kondo et al. | |
| 2010/0062324 A1 | 3/2010 | Ooyama | |

FOREIGN PATENT DOCUMENTS

JP        05-045893 U     6/1993

OTHER PUBLICATIONS

"International Search Report", Mailed Date: Jun. 26, 2013, Application No. PCT/US2013/031806, Filed Date: Mar. 15, 2013, pp. 10.

(Continued)

*Primary Examiner* — Gary Harris
(74) *Attorney, Agent, or Firm* — Jeremy Snodgrass; Judy Yee; Micky Minhas

(57) ABSTRACT

A slidable battery door assembly is described. In implementations, the slidable battery door assembly (hereinafter "door assembly") includes a door that is slidable to control access to a battery compartment for a device. Also included is a battery contact inside the battery compartment that is coupled to the door. When the door is closed, the battery contact holds a battery in place and serves as a portion of an electrical circuit that includes the battery. The door may be slidably opened such that the battery contact releases the battery, allowing the battery to be removed from the battery compartment. Thus, the door assembly enables easy installation and removal of a battery. Further, the door assembly can be positioned to hold a battery securely in place and provide an electrically conductive connection between the battery and an electrical circuit.

20 Claims, 11 Drawing Sheets

(56) References Cited

OTHER PUBLICATIONS

"Installing Canon Powershot A610 Camera Housing", Retrieved at <<http://www.ifixit.com/Guide/Installing-Canon-Powershot-A610-Camera-Housing/4994/1>>, Retrieved Date: Dec. 30, 2011, pp. 3.

"Kodak Advantix T70 Zoom Camera—User's Manual", Retrieved at <<http://www.kodak.com/global/en/service/advantix/t70/ownerManual/loadBattery.shtml>>, Retrieved Date: Dec. 30, 2011, pp. 2.

* cited by examiner

SLIDABLE BATTERY DOOR ASSEMBLY

BACKGROUND

Many devices use some form of removable battery as a source of electrical power. Typical ways of inserting and removing a battery from a device, however, suffer from a number of drawbacks. For example, some battery compartments include a flip-up door that can be difficult to open and may be prone to breakage. Some other battery compartments include a removable cover than can be lost. Further, a battery can be difficult to install or remove from such compartments.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A slidable battery door assembly is described. In implementations, the slidable battery door assembly (hereinafter "door assembly") includes a door that is slidable to control access to a battery compartment for a device. Also included is a battery contact inside the battery compartment that is coupled to the door. When the door is closed, the battery contact holds a battery in place and serves as a portion of an electrical circuit that includes the battery. The door may be slidably opened such that the battery contact releases the battery, allowing the battery to be removed from the battery compartment. Thus, the door assembly enables easy installation and removal of a battery. Further, the door assembly can be positioned to hold a battery securely in place and provide an electrically conductive connection between the battery and an electrical circuit.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

A slidable battery door assembly is described. In implementations, the slidable battery door assembly (hereinafter "door assembly") includes a door that is slidable to control access to a battery compartment for a device. Also included is a battery contact inside the battery compartment that is coupled to the door. When the door is closed, the battery contact holds a battery in place and serves as a portion of an electrical circuit that includes the battery. The door may be slidably opened such that the battery contact releases the battery, allowing the battery to be removed from the battery compartment. Thus, the door assembly enables easy installation and removal of a battery. Further, the door assembly can be positioned to hold a battery securely in place and provide an electrically conductive connection between the battery and an electrical circuit.

In the following discussion, an example environment is first described that is operable to employ techniques described herein. Next, a section entitled "Implementation Examples" describes some example implementations and operating scenarios in accordance with one or more embodiments. Finally, a section entitled "Battery Support" describes an example battery support in accordance with one or more embodiments.

Example Environment

Figure 1:
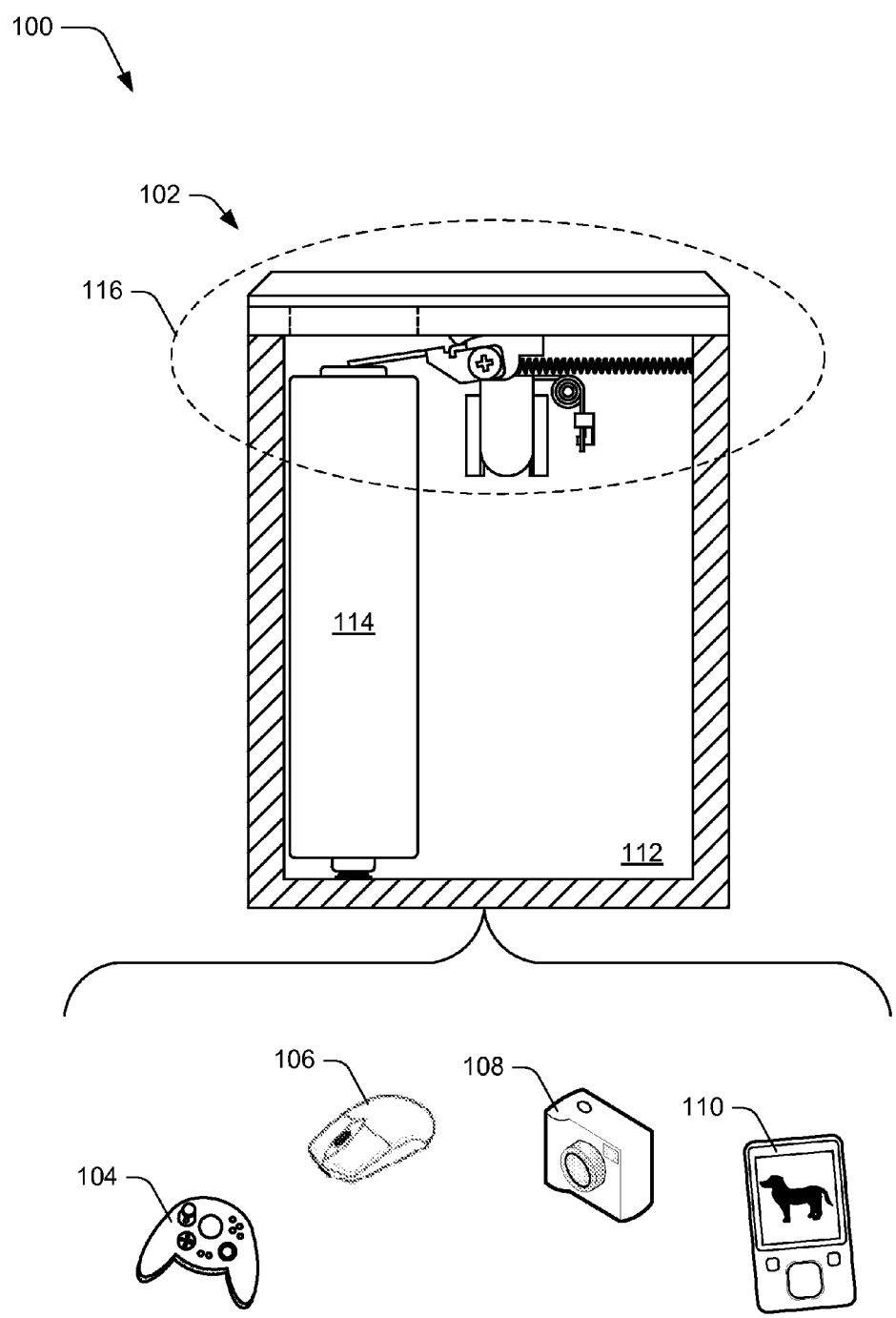
FIG. 1 is an illustration of an environment in an example implementation that is operable to employ techniques discussed herein.

FIG. 1 is an illustration of an environment 100 in an example implementation that is operable to implement embodiments discussed herein. The illustrated environment 100 includes a device 102, which may be configured in a variety of ways. For instance, the device 102 may be configured as a joystick 104, a mouse 106, a camera 108, a smartphone 110, and so forth. Although example implementations of the device 102 are illustrated, the device 102 may be implemented and/or configured in a variety of other ways.

The device 102 includes a battery compartment 112, which is configured to hold a battery 114. The battery 114 is presented for purposes of example only, and embodiments can be employed to hold a wide variety of different battery types and configurations for a device. For example, the battery 114 is illustrated as a cylindrical battery. In at least some embodiments, other battery types can be accommodated, such as rectangular batteries, flat batteries (e.g., cell phone batteries), disc-style batteries (e.g., watch batteries), and so on. Further, implementations can enable more than one battery to be held in a device in accordance with one or more embodiments.

Included as part of the battery compartment 112 is a slidable battery door assembly ("door assembly") 116. In at least some embodiments, the door assembly 116 is slidably connected to the battery compartment 112 to provide access to the battery compartment 112 such that the battery 114 can be installed and/or removed from the battery compartment 112. Further, portions of the door assembly 116 can be positioned to hold the battery 114 securely in place within the battery compartment 112, and can provide an electrically conductive connection between the battery 114 and an electrical circuit of the device 102.

For purposes of illustration, embodiments are discussed herein with respect to particular combinations structures. For example, the door assembly 116 is illustrated in particular orientations with respect to the battery compartment 112 and other features of the device 102. This is not intended to be limiting, however, and embodiments can be implemented in a variety of orientations and in combination with a variety of different structures in accordance with the claimed embodiments. For example, the battery compartment 112 can include other structures that are not expressly illustrated here while remaining within the spirit and scope of the claimed embodiments.

Having discussed an example environment in which embodiments can be employed, consider now some detailed implementation examples in accordance with one or more embodiments.

Implementation Examples

The following discussion presents some detailed implementation examples and operating scenarios in accordance with one or more embodiments.

Figure 2:
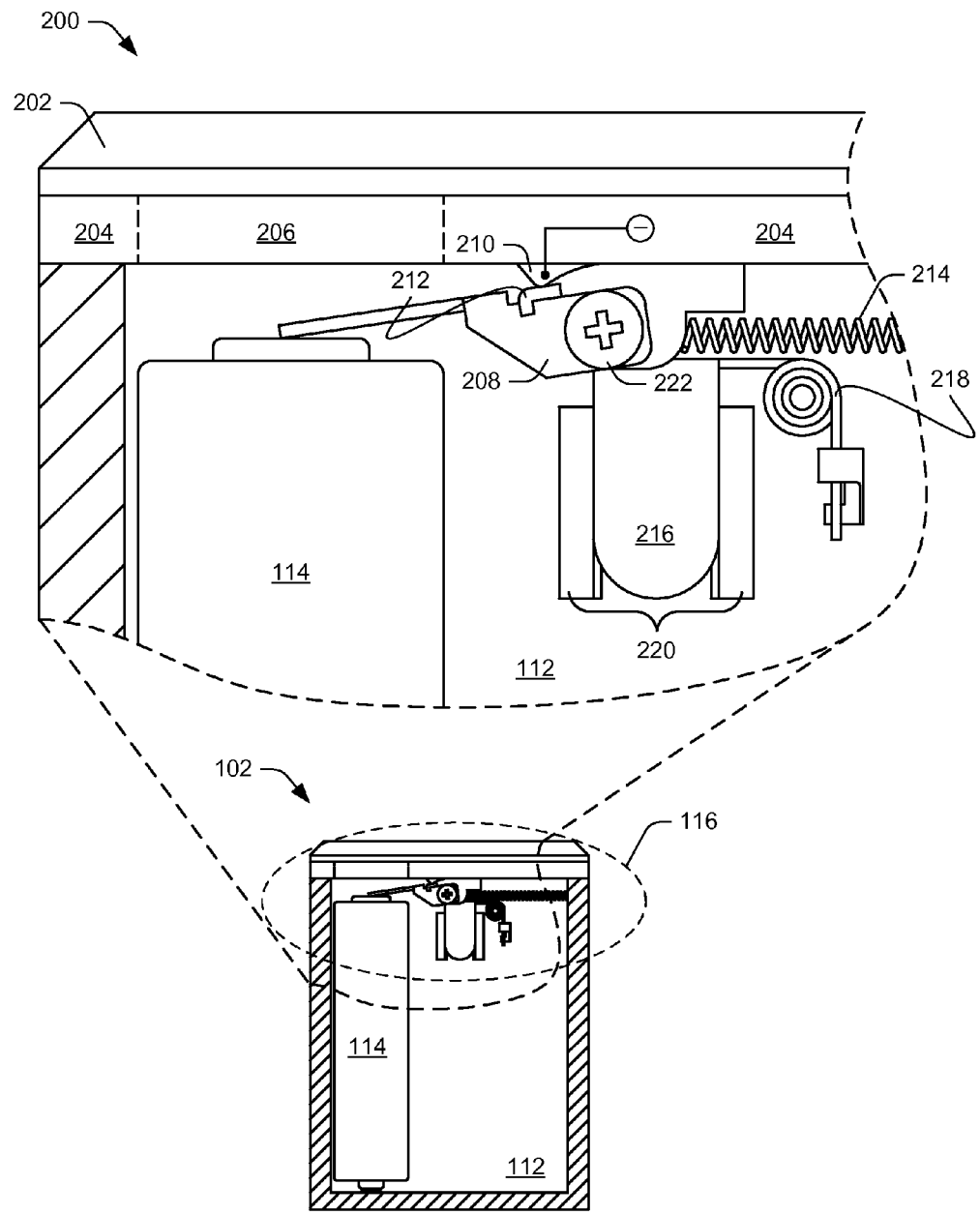
FIG. 2 illustrates an example implementation of a slidable battery door assembly in accordance with one or more embodiments.

FIG. 2 illustrates a sectional view 200 of a portion of the device 102 in accordance with one or more embodiments. The section view 200 includes detailed aspects of the door assembly 116. Illustrated in the sectional view 200 is a door 202 that is configured to slide on a top surface 204 of the battery compartment 112. The top surface 204 includes an aperture 206 through which the battery 114 may pass through the top surface 204. In implementations, the door 202 can be manipulated to slide across the top surface 204 to cover and uncover the aperture 206.

Further illustrated is a battery contact 208, which is coupled to the door 202 through a door channel in the top surface 204. The door channel is not expressly illustrated here, but is illustrated in additional figures discussed below. The battery contact 208 is configured to apply pressure to the battery 114 to hold the battery 114 in place within the battery compartment 112. Further, the battery contact 208 is formed from an electrically conductive material and serves as an electrically conductive connection between the battery 114 and an electrical circuit of the device 102. For example, the battery contact 208 can connect a negative pole of the battery 114 to an electrical circuit of the device 102. Thus, the door 202 and the battery contact 208 form at least a portion of the door assembly 116, which is slidably attached to the top surface 204 such that the door assembly 116 can be manipulated to cover and uncover the aperture 206.

Protruding from the top surface 204 and into the battery compartment 112 is a contact stop 210, which applies downward pressure on a contact point 212 of the battery contact 208. The contact stop 210 can enable the battery contact 208 to apply pressure to the battery 114. Further, the contact stop can serve as a connection point from the battery contact 208 to an electrical circuit of the device 102. For example, the contact stop 210 can be formed from an electrically conductive material and can be connected (e.g., soldered) to an electrical circuit of the device 102. Thus, when the door assembly 116 is in a closed position (as illustrated here), electricity can flow between the battery 114, the battery contact 208, the contact stop 210, and an electrical circuit of the device 102. Further, the top surface 204 can be formed from a non-electrically conductive material to help prevent electrostatic discharge from harming internal components of the device 102.

Further illustrated is a door spring 214, which is attached to the battery contact 208 and an inside surface of the battery compartment 112. The door spring 214 exerts a rearward pressure on the battery contact 208, e.g., away from the battery 114. To hold the door assembly 116 in a closed position against the pressure of the door spring 214, a latch 216 is provided. The latch 216 is held in an upward position by a latch spring 218 that applies upward pressure against the latch 216. In implementations, a rear surface of the battery contact 208 rests against the latch 216 such that the latch 216 can prevent rearward movement of the door assembly 116. The latch 216 is positioned within a latch guide 220, which enables the latch 216 to move upward and downward with reference to the latch guide 220.

The door assembly 116 further includes a shaft 222, around which the battery contact 208 can pivot. For example, the battery contact 208 can be rotatably mounted on the shaft 222 such that when the door assembly 116 moves towards an open position, the battery contact 208 can pivot upward toward the top surface 204. Further details concerning example operations of the door assembly 116 are discussed below.

Figure 3:
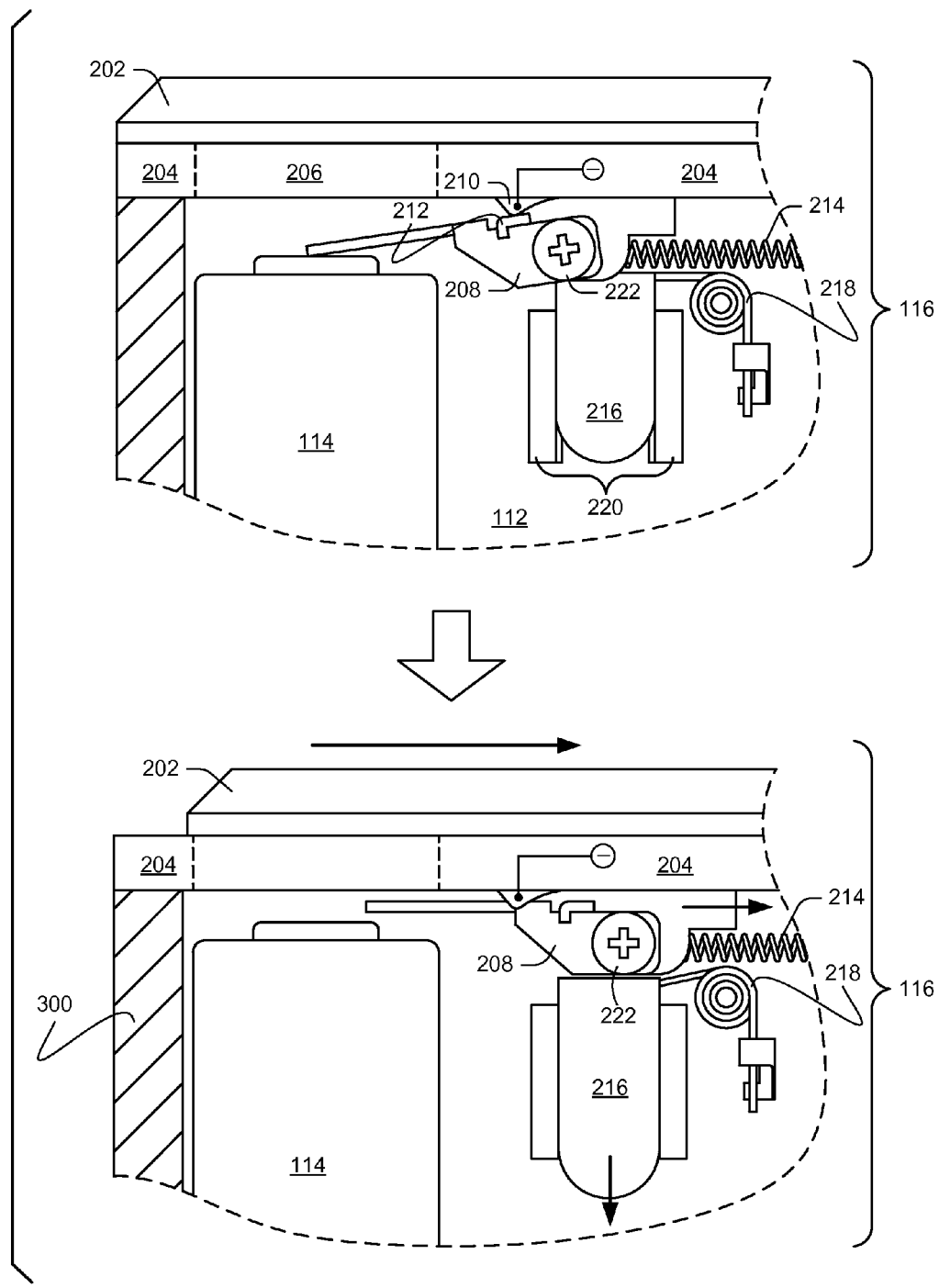
FIG. 3 illustrates an example operating scenario in accordance with one or more embodiments.

FIG. 3 illustrates an example operating scenario according to one or more embodiments. Starting with the upper portion of FIG. 3, the door assembly 116 is in a closed position, such as described above with reference to FIG. 2. Continuing to the lower portion of FIG. 3, the door assembly 116 begins transitioning to an open position. For example, a user can apply downward pressure to the latch 216, which can allow the battery contact 208 to clear the latch 216 such that the door assembly 116 can move backward in response to pressure from the door spring 214. As illustrated, the door 202 slides across the top surface 204 and away from an edge 300 of the device 102. Further, the battery contact 208 pivots upward on the shaft 222 and moves away from the battery 114.

Although not expressly illustrated here, the battery contact 208 can include an internal contact spring that exerts upward pressure on the battery contact 208. For example, the contact spring can be mounted adjacent to the shaft 222 and rest against an upper inside surface of the battery contact 208. When the battery contact 208 moves back away from the edge 300 and clears the contact stop 210, pressure from the contact spring can cause the battery contact 208 to rotate upward on the shaft 222 and toward the top surface 204. Thus, the battery contact 208 releases the battery 114, and the continuity of an electrical circuit that includes the battery 114 is interrupted.

Figure 4:
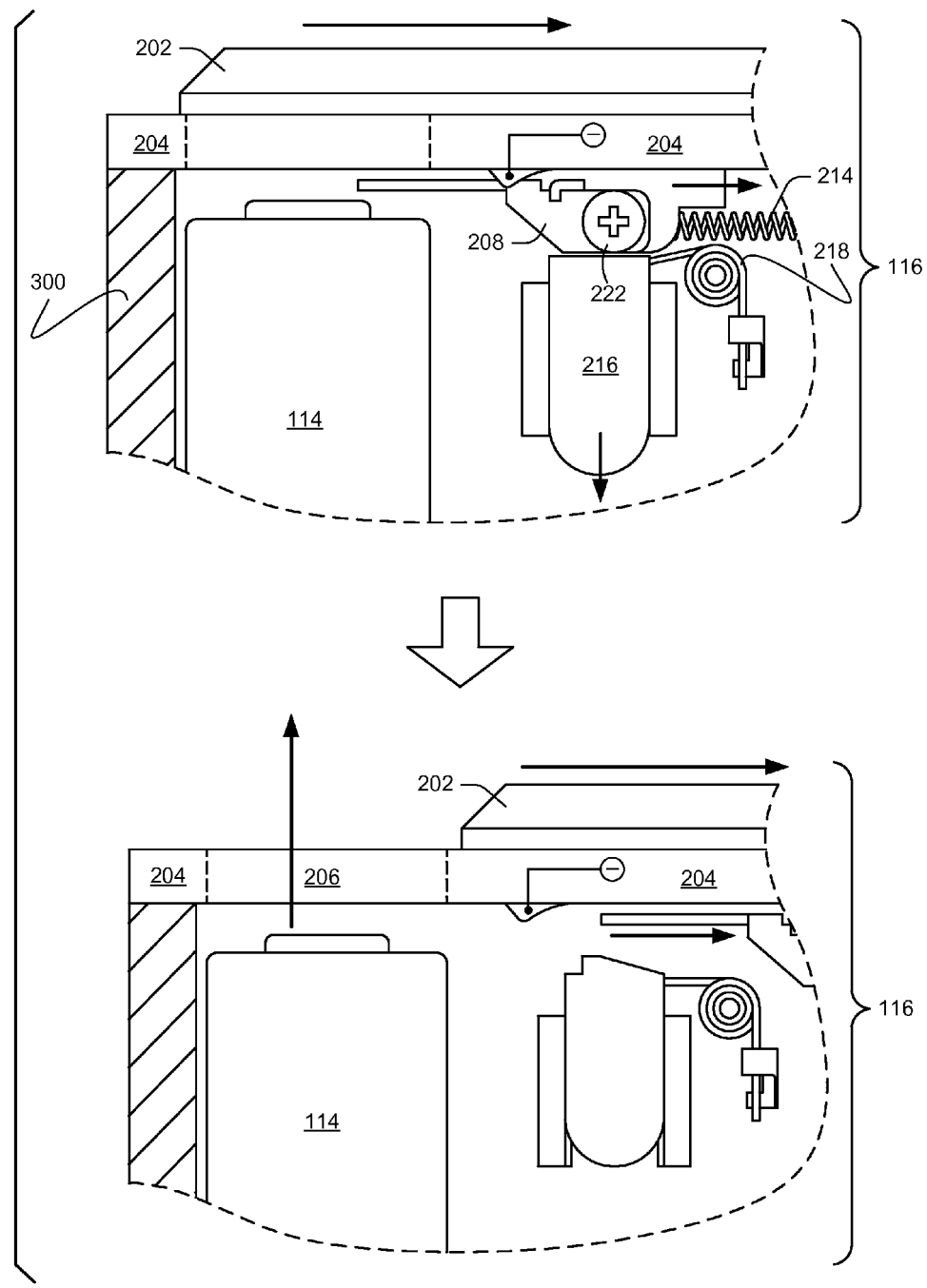
FIG. 4 illustrates an example operating scenario in accordance with one or more embodiments.

FIG. 4 illustrates another example operating scenario according to one or more embodiments. In implementations, FIG. 4 illustrates a continuation of the operating scenario described above with reference to FIG. 3.

Starting with the upper portion of FIG. 4, the door assembly 116 is transitioning to an open position, such as described above with reference to FIG. 3. Continuing to the lower portion of FIG. 4, the door assembly 116 transitions to an open position. For example, the door 202 moves away from the edge 300 and clears the aperture 206. Further, the battery contact 208 moves away from and clears the battery 114. Thus, the battery 114 may be removed from the device 102. For example, the device 102 can be inverted such that the battery 114 slides out of the battery compartment 112 through the aperture 206.

Figure 5:
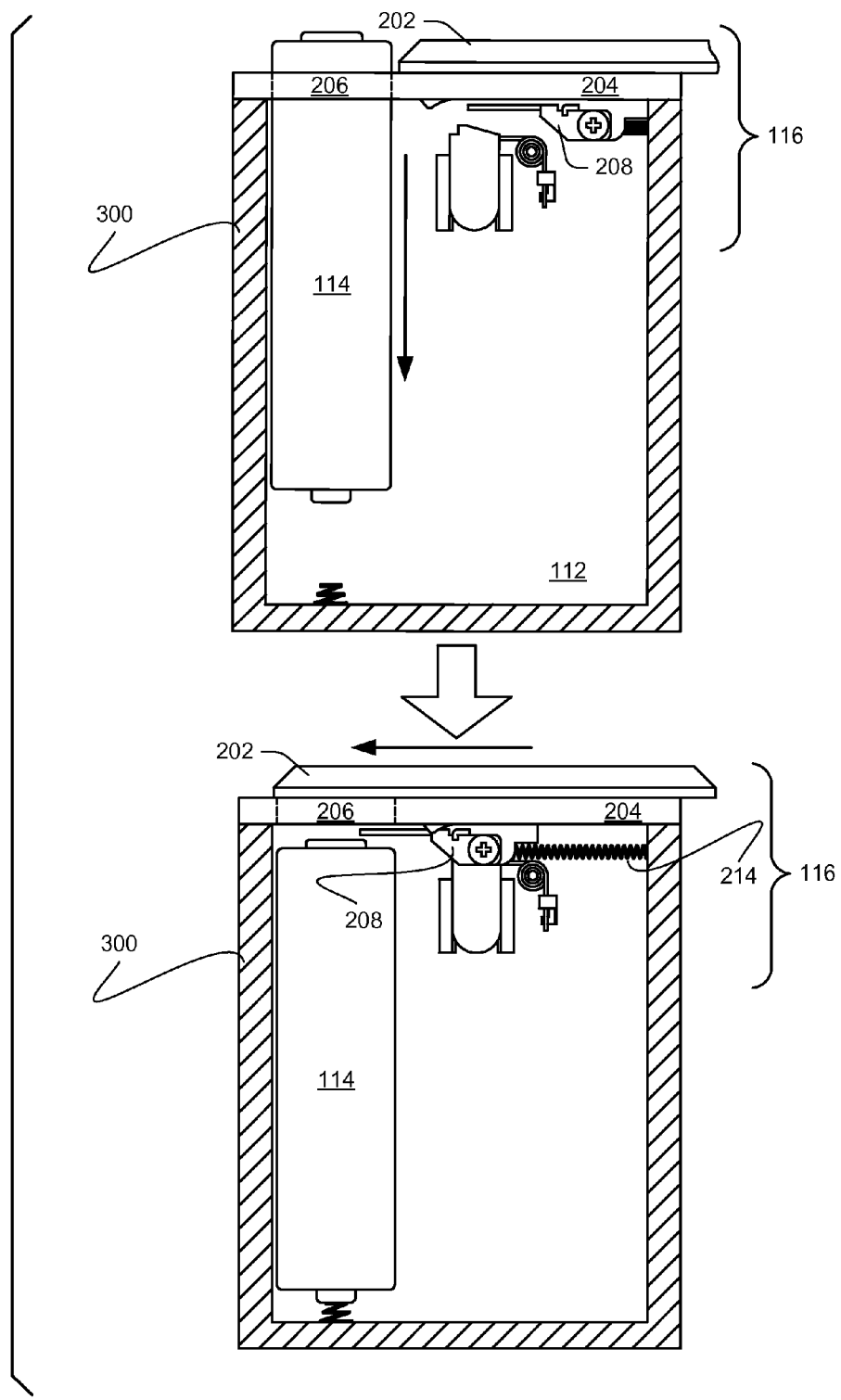
FIG. 5 illustrates an example operating scenario in accordance with one or more embodiments.

FIG. 5 illustrates a further example operating scenario in accordance with one or more embodiments. This operating scenario describes an example way of installing a battery into the device 102. Starting with upper portion of FIG. 5, the door assembly 116 is in an open position. The battery 114 is inserted through the aperture 206 into the battery compartment 112.

Continuing to the lower portion of FIG. 5, the door assembly 116 begins transitioning to a closed position. For example, a user can push the door 202 towards the edge 300, e.g., by manually sliding the door 202 across the top surface 204. As illustrated, the battery contact 208 moves toward the battery 114. As referenced above, the door spring 214 places rearward pressure on the battery contact 208, and thus also on the door assembly 116. Thus, user manipulation of the door 202 towards the edge 300 can be counter to tension applied by the door spring 214.

Figure 6:
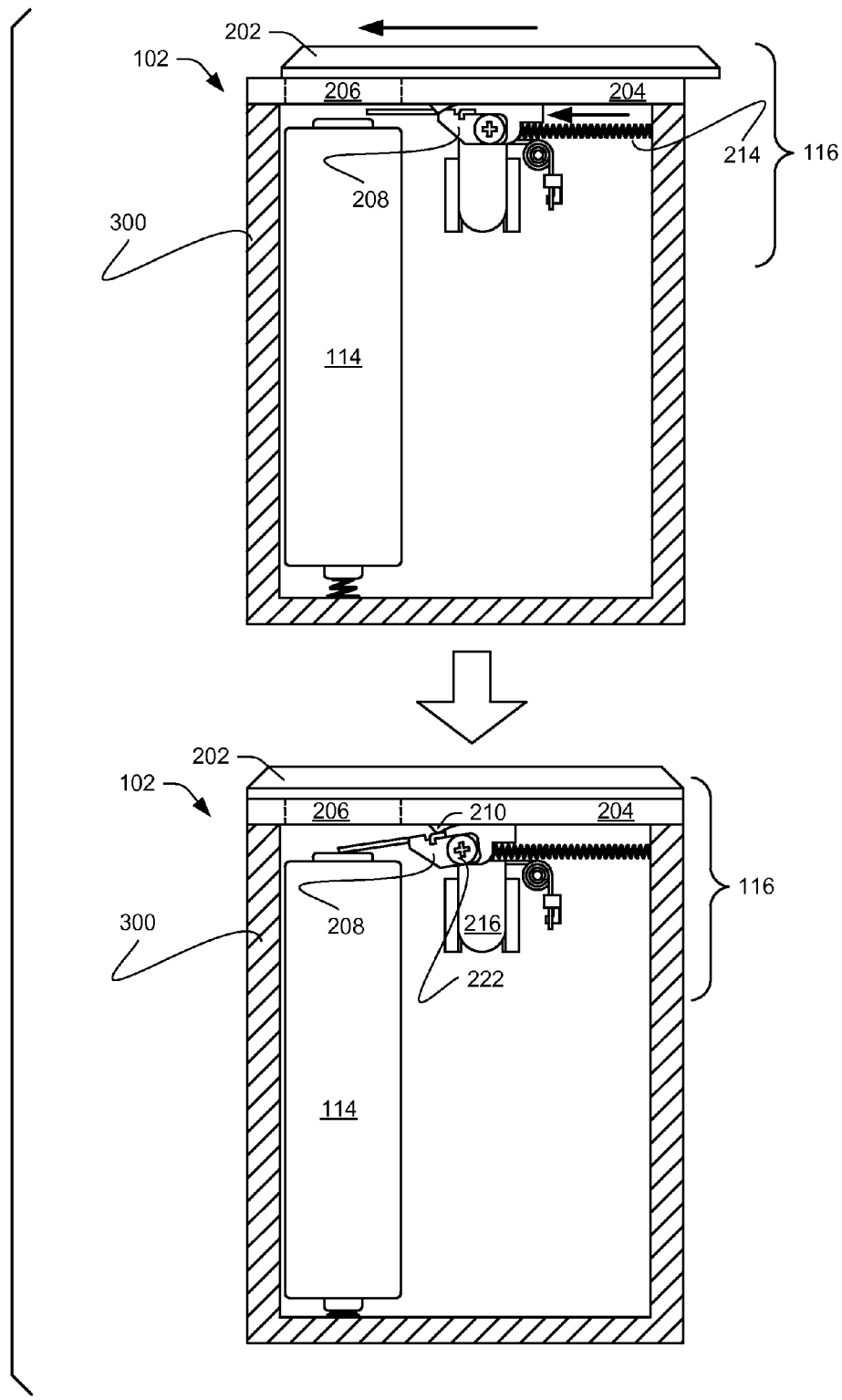
FIG. 6 illustrates an example operating scenario in accordance with one or more embodiments.

FIG. 6 illustrates a further example operating scenario according to one or more embodiments. In implementations, FIG. 6 illustrates a continuation of the operating scenario described above with reference to FIG. 5.

Starting with the upper portion of FIG. 6, the door assembly 116 is transitioning to a closed position, as described above with reference to FIG. 5. Continuing to the lower portion of FIG. 6, the door assembly 116 transitions to a closed position. For example, a user can manipulate the door 202 toward the edge 300 until the latch 216 engages with the battery contact 208. As illustrated, transitioning to the closed position causes the battery contact 208 to impinge on the contact stop 210. As the door assembly 116 transitions further towards the closed position, impingement of the battery contact 208 on the contact stop 210 causes the battery contact 208 to rotate on the shaft 222 and contact the top of the battery 114. Thus, when the latch 216 engages the battery contact 208, the battery contact 208 is applying pressure to the battery 114. As referenced above, this secures the battery 114 in position, and electrically connects the battery 114 to an electrical circuit of the device 102.

Figure 7:
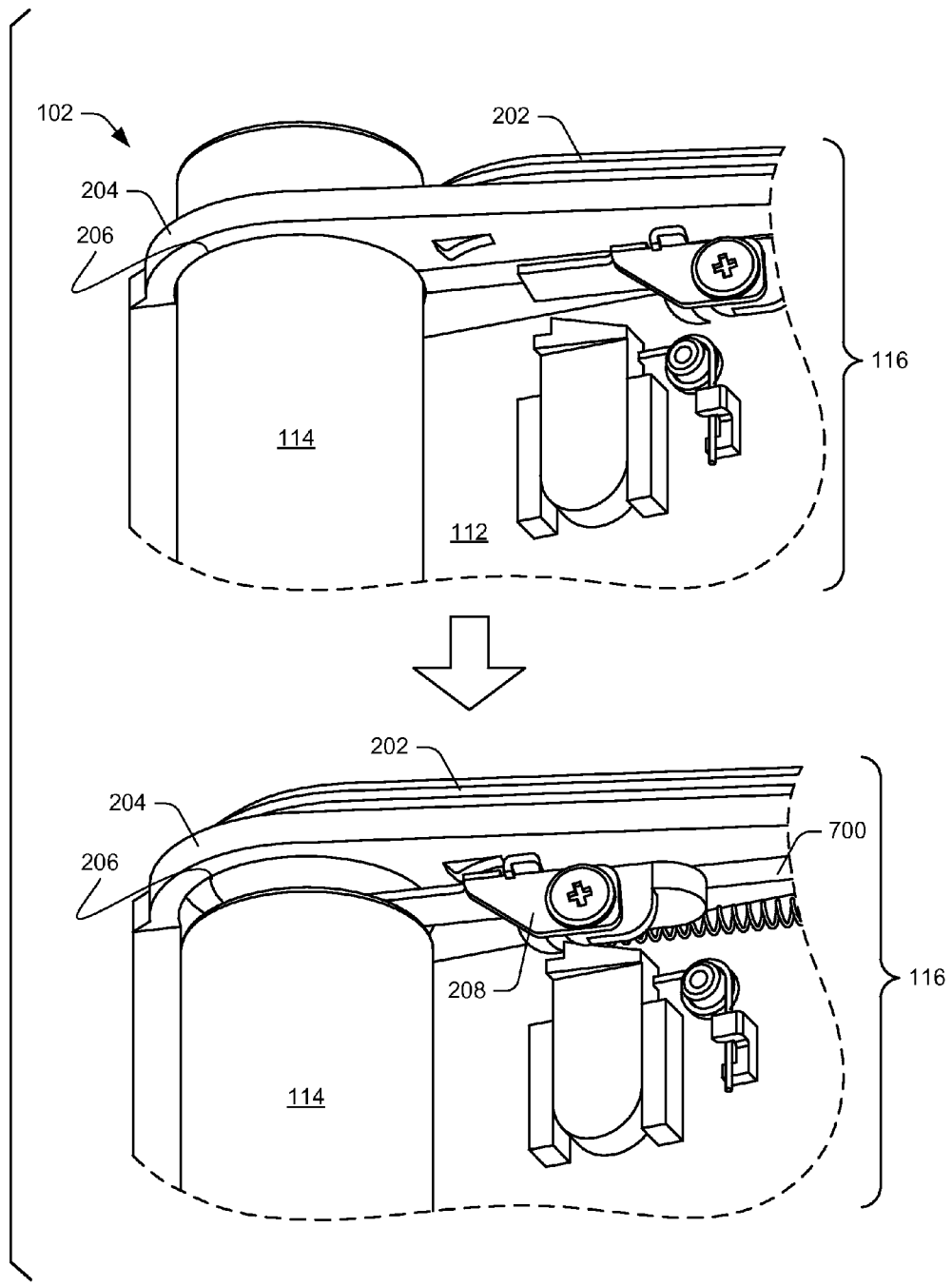
FIG. 7 illustrates an example operating scenario in accordance with one or more embodiments.
Figure 8:
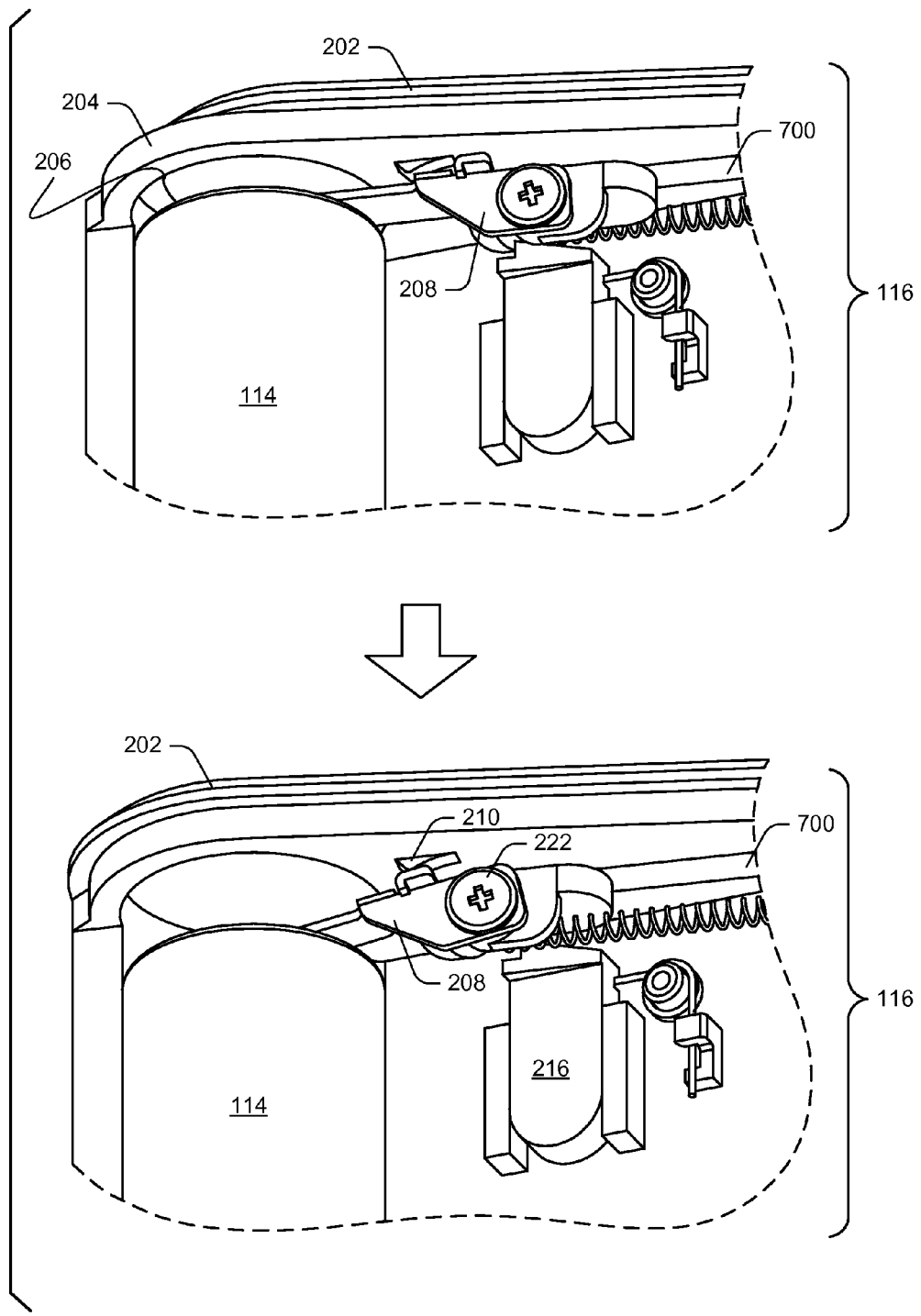
FIG. 8 illustrates an example operating scenario in accordance with one or more embodiments.

FIGS. 7 and 8 illustrate further example operating scenarios according to one or more embodiments. In implementations, the operating scenarios illustrated in FIGS. 7 and 8 present an alternative visual perspective of the operating scenarios illustrated in FIGS. 5 and 6.

Starting in the upper portion of FIG. 7, the door assembly 116 is illustrated in the open position. The battery 114 is inserted into the battery compartment 112 through the aperture 206.

Continuing to the lower portion of FIG. 7, the door assembly 116 begins transitioning to a closed position. For example, a user can apply pressure to the door 202, which causes the door 202 to slide across the top surface 204. Further illustrated is a door channel 700, which is a perforation in the top surface 204. As referenced above, the door 202 and the battery contact 208 are slidably coupled through the door channel 700. Thus, the door 202 and the battery contact 208 can form an integrated door assembly that can move within the door channel 700 to implement techniques discussed herein.

In implementations, a fastening means used to attach the battery contact 208 to the door 202 can be non-conductive such that electrical current is not conducted from the battery contact 208 to the door 202. For example, a bottom surface of the door 202 that contacts the upper surface 204 of the device 102 can be coated with a non-conductive material. The battery contact 208 can be fastened to the non-conductive material to enable the battery contact 208 and the door 202 to move as an integrated structure, while preventing electrical conduction to the door 202. Further, such non-conductive coating on the bottom surface of the door 202 can enable the door 202 to move smoothly across the upper surface 204 and can aid in preventing electrostatic discharge that may harm components of the device 102.

FIG. 8 illustrates a further operating scenario in accordance with one or more embodiments. In implementations, the operating scenario illustrated in FIG. 8 is a further extension of the operating scenario described above in FIG. 7.

Starting with the upper portion of FIG. 8, the door assembly 116 is transitioning to a closed position, as described above with reference to FIG. 7. Continuing to the lower portion of FIG. 8, the door assembly 116 transitions to a closed position. For example, a user manipulates the door 202 such that the door assembly 116 travels within the door channel 700 until the latch 216 engages with the battery contact 208. As illustrated, transitioning to the closed position causes the battery contact 208 to impinge on the contact stop 210. As the door assembly 116 transitions further towards the closed position, the battery contact 208 presses on the contact stop 210, which causes the battery contact 208 to rotate on the shaft 222 and contact the top of the battery 114. Thus, when the latch 216 engages the battery contact 208, the battery contact 208 is pressing down on the battery 114. As referenced above, this secures the battery 114 in position, and electrically connects the battery 114 to an electrical circuit of the device 102.

The operating scenarios described above with reference to FIGS. 5-8 describe example ways in which the door assembly 116 can be closed. As illustrated, a user can close the door assembly 116 by manipulating the door 202 across the top surface 204. In implementations, a user can close the door assembly 116 with a single motion that slides the door 202 across the top surface 204 to the closed position.

Figure 9:
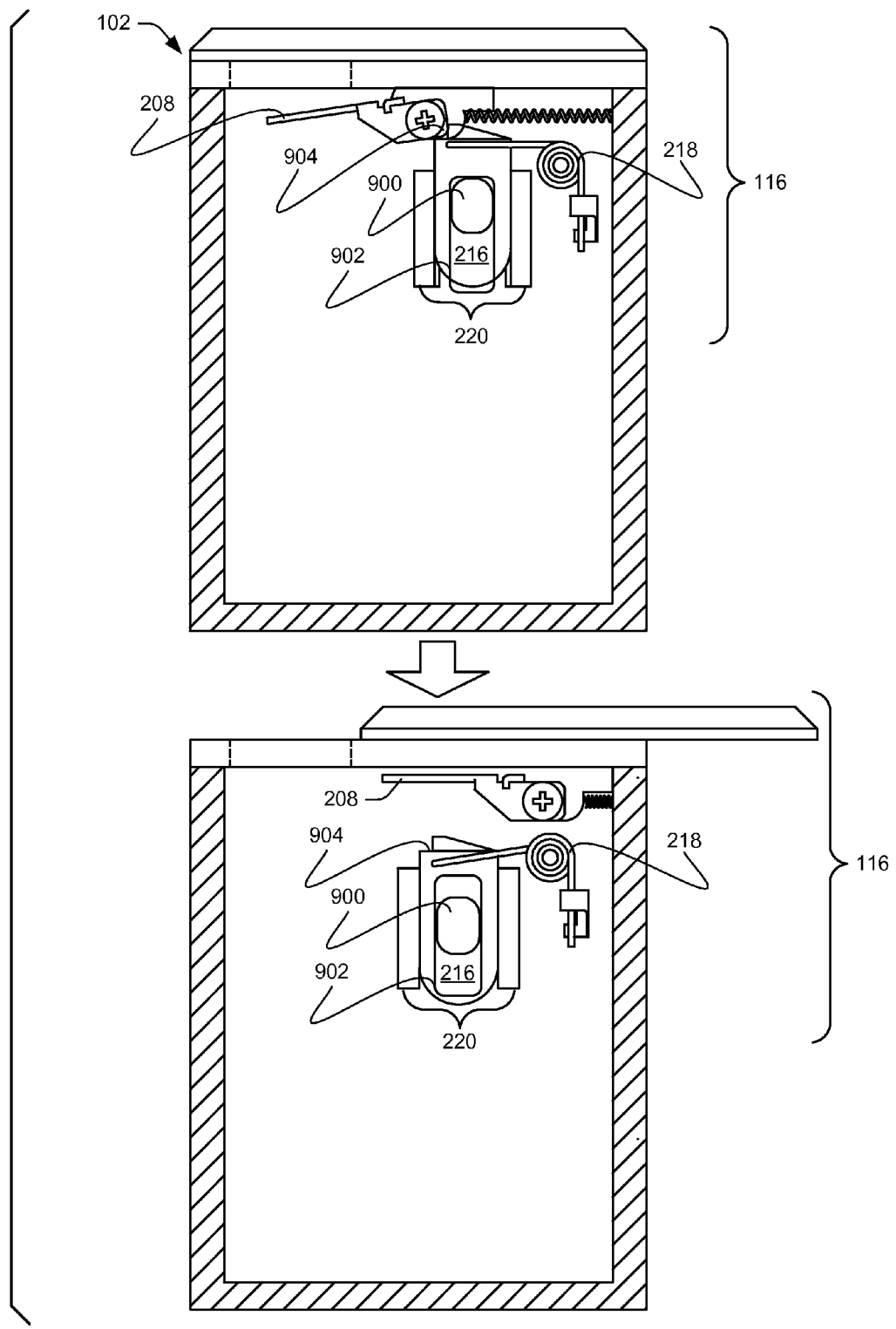
FIG. 9 illustrates an example operating scenario in accordance with one or more embodiments.

FIG. 9 illustrates a further example operating scenario according to one or more embodiments. In implementations, FIG. 9 illustrates an example implementation of the latch 216.

In the upper portion of FIG. 9, the latch 216 is illustrated as part of the device 102. To simplify understanding, other portions of the device 102 are omitted from this illustration. Fastened to the latch 216 is a latch button 900, which is positioned within a latch channel 902. In implementations, the latch button 900 can be formed as a protrusion from the latch 216 that protrudes into the latch channel 902. The latch channel 902 is a perforation in an external surface of the device 102 that enables a user to access the latch button 900. The latch spring 218 provides upward pressure on the latch 216 such that the latch button 900 rests in an upper portion of the latch channel 902.

Further illustrated is a notch 904 in the latch 216. The notch 904 serves as a catch point on the latch 216 for the battery contact 208. When the door assembly 116 is manipulated towards the closed position, the battery contact 208 impinges on the latch 216. This causes the latch 216 to move downward in the latch guide 220, e.g., against the pressure of the latch spring 218. When the battery contact reaches the position of the notch 904, pressure from the latch spring 218 causes the latch 216 to move upward such that the notch 904 engages the battery contact 208 and prevents the battery contact 208 (and thus the door assembly 116) from transitioning back to an open position.

Continuing to the lower portion of FIG. 9, a user applies downward pressure on the latch button 900. For example, a user can press downward on the latch button 900 using a finger, a thumb, a pointing device, and so forth. This causes the latch 216 to move downward in the latch guide 220 and the notch 904 to disengage the battery contact 208. When the notch 904 disengages the battery contact 208, the door spring 214 can pull the battery contact 208 (and thus the door assembly 116) into the open position. Further, when a user releases pressure from the latch button 900, the latch spring 218 will push the latch 216 upward in the latch guide 220. Thus, the latch 216 can be implemented as a spring-activated latch the can hold a door assembly closed, and can be disengaged to open the door assembly.

Battery Support

Figure 10:
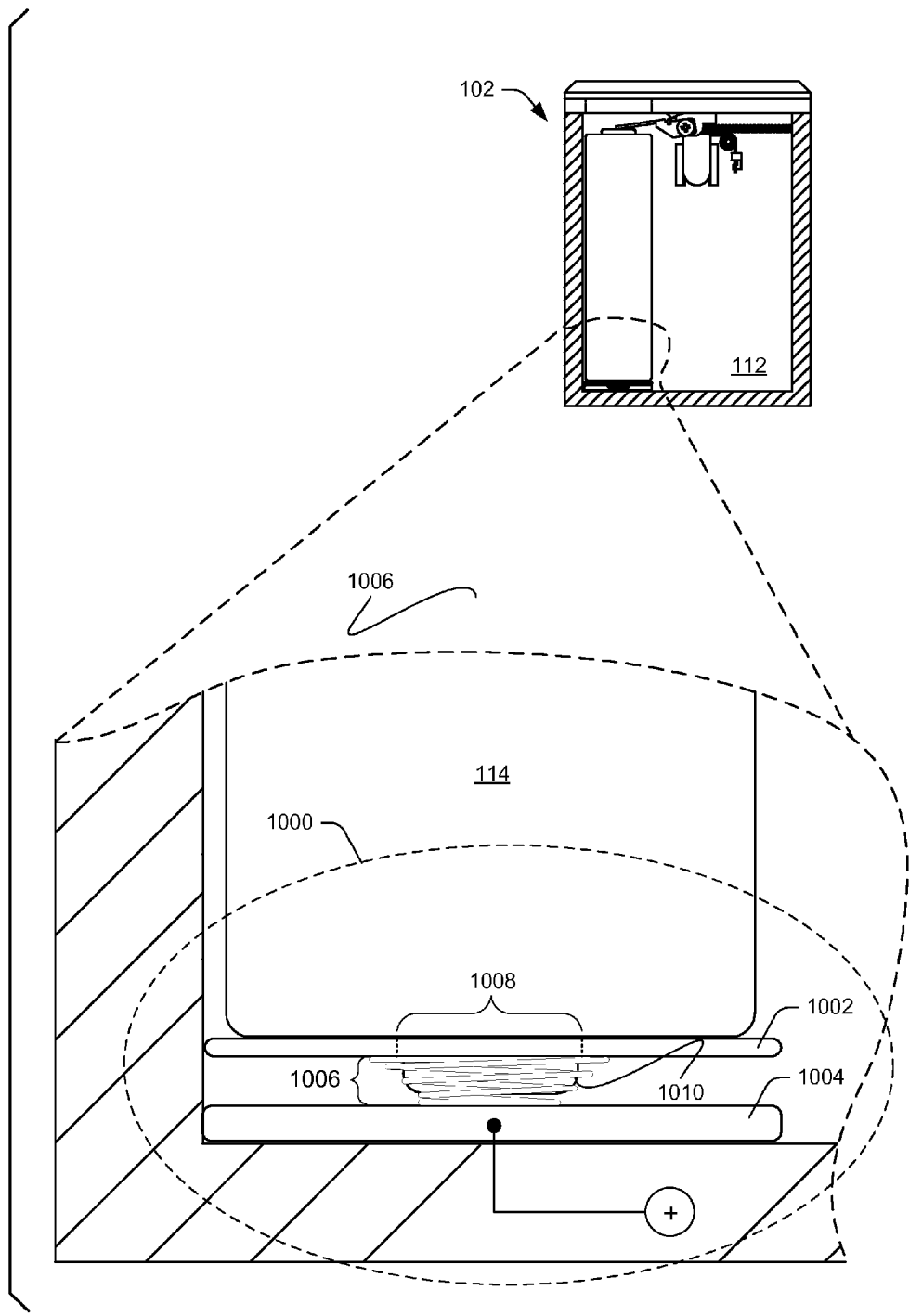
FIG. 10 illustrates an example battery support in accordance with one or more embodiments.

FIG. 10 illustrates a battery support 1000 in accordance with one or more embodiments. The battery support 1000 is attached within the battery compartment 112 of the device 102, and includes a support structure 1002 and a contact plate 1004. Attached to the support structure 1002 and the contact plate 1004 is a support spring 1006. The support spring 1006 separates the support structure 1002 from the contact plate 1004 and acts as a support mechanism for the support structure 1002. The support structure 1002 includes a support aperture 1008, which is a perforation in the surface of the support structure 1002 that enables a pole 1010 of the battery 114 to protrude through the support structure 1002.

In implementations, the support structure 1002 is configured to support an end of the battery 114 such that the pole 1010 can protrude through the support aperture 1008 and make electrical contact with the support spring 1006 and the contact plate 1004. For example, the pole 1010 can be a positive pole of the battery 114, and the support spring 1006 and the contact plate 1004 can be formed from electrically conductive material such that the support spring 1006 and/or the contact plate 1004 can connect the pole 1010 to an electrical circuit of the device 102. In implementations, FIG. 10 illustrates an example of a correct placement of the battery 114 in the battery compartment 112.

Figure 11:
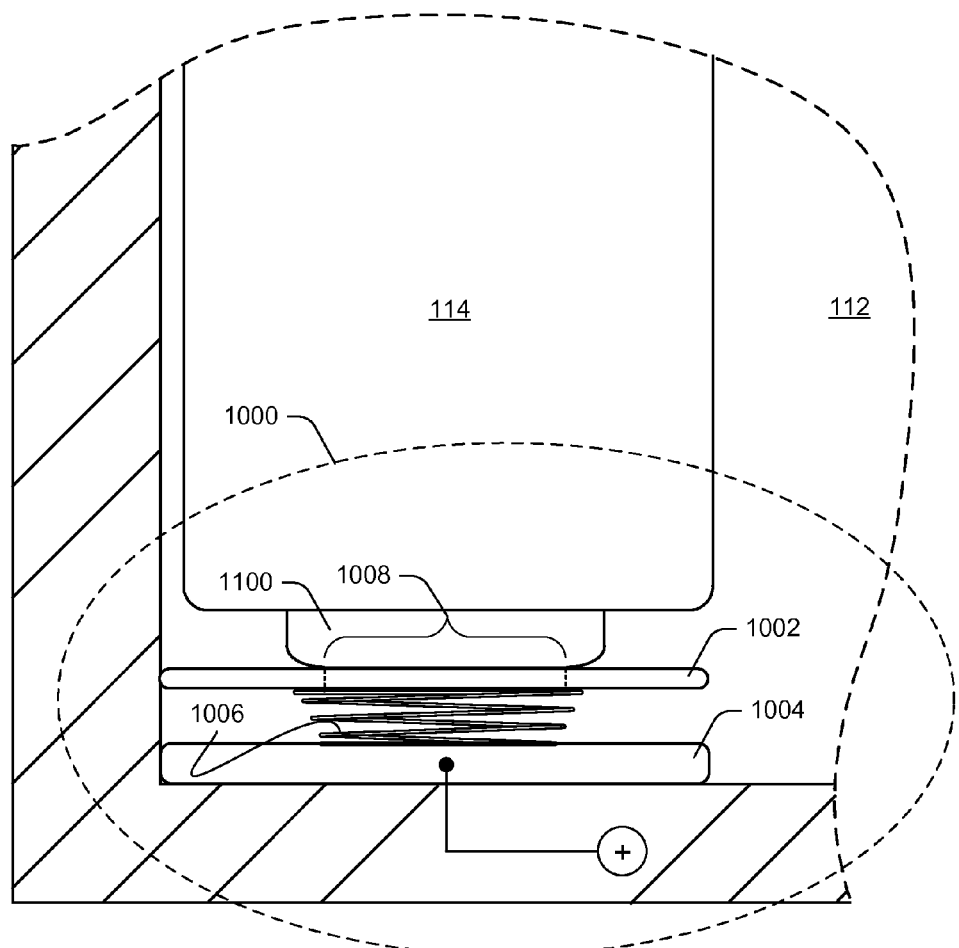
FIG. 11 illustrates an example operating scenario in accordance with one or more embodiments.

FIG. 11 illustrates an example operating scenario that utilizes the battery support 1000, in accordance with one or more embodiments. In implementations, the battery support 1000 can be configured such that electrical contact with the contact plate 1004 and/or the support spring 1006 is not made if the battery 114 is incorrectly inserted in the battery compartment 112. For example, as illustrated in FIG. 11, the battery 114 is inverted such that a pole 1100 of the battery 114 (e.g., a negative pole) is placed against the support structure 1002. The dimensions and/or placement of the support aperture 1008 are such that the pole 1100 does not protrude through the support aperture 1008. For example, the circumference of the support aperture 1008 can be smaller than the circumference of the pole 1100 such that the pole 1100 rests on the top surface of the support structure 1002 and does not protrude into the support aperture 1008. Further, the support structure 1002 can be formed from non-electrically conductive material (e.g., an electrical insulator) such that the pole 1100 does not make electrical contact with the contact plate 1004 or the support spring 1006.

In implementations, when the battery 114 is inverted as shown in FIG. 11, the battery support 1000 can prevent the battery 114 from seating properly in the battery compartment 112 such that the door assembly 116 can be prevented from closing. For example, the tolerances of the door assembly 116 can be such that when the battery 114 is not correctly seated in the battery support 1000 (as illustrated here), the battery 114 is held in a position which interferes with movement of the battery contact 208. Thus, if a user attempts to close the door assembly 116 when the battery 114 is incorrectly inserted in the battery compartment 112, the door assembly 116 can impinge upon the battery 114 such that the latch 216 will not engage the battery contact 208. This can prevent the door assembly 116 from reaching a fully closed position, and can provide an indication to a user that the battery 114 is improperly inserted in the battery compartment 112.

CONCLUSION

A slidable battery door assembly described. Although embodiments are described in language specific to structural features and/or methodological acts, it is to be understood that the embodiments defined in the appended claims are not necessarily limited to the specific features or acts described. Rather, the specific features and acts are disclosed as example forms of implementing the claimed embodiments.

What is claimed is:

1. A device comprising:
  a battery compartment including an aperture through which a battery is insertable into the battery compartment; and
  a slidable battery door assembly slidably attached to the battery compartment, the slidable battery door assembly including:
    a door configured to be manipulable to cover and uncover the aperture; and
    a battery contact coupled to the door and positioned to hold the battery in place in the battery compartment such that the battery contact is positioned to form an electrical connection between the battery and at least a portion of an electrical circuit of the device, the battery contact being rotatably attached to the door such that responsive to the door being manipulated from an open position to a closed position, the battery contact pivots away from the door to a battery hold position.

2. The device as recited in claim 1, wherein the battery contact is coupled to the door through a channel in a surface of the battery compartment.

3. The device as recited in claim 1, wherein the door is manipulable to the closed position such that the battery contact pivots onto a surface of the battery and applies pressure to the surface of the battery to hold the battery in place in the battery compartment and connect the battery to the at least a portion of the electrical circuit of the device.

4. The device as recited in claim 3, wherein when the door is manipulated to the closed position, the battery contact pivots onto the surface of the battery in response to the battery contact impinging upon a contact stop protruding from a surface of the battery compartment.

5. The device as recited in claim 4, wherein the contact stop is connected to the electrical circuit of the device such that when the door is manipulated to the closed position, electricity can flow between the battery and the electrical circuit via contact between the battery contact and the contact stop.

6. The device as recited in claim 1, further comprising a spring-activated latch configured to hold the slidable battery door assembly in a closed position, the latch being configured to be manipulated to release the slidable battery door assembly such that the slidable battery door assembly transitions to an open position.

7. The device as recited in claim 1, further comprising a battery support configured to prevent electrical contact between the battery and at least a portion of the electrical circuit if the battery is incorrectly inserted in the battery compartment.

8. The device as recited in claim 1, further comprising a battery support configured to prevent the slidable battery door assembly from closing if the battery is incorrectly inserted in the battery compartment.

9. A slidable battery door assembly for a device, comprising:
  a door configured to be slidable to cover and uncover an aperture in a surface of a battery compartment of the device through which a battery may pass; and
  a battery contact coupled to the door and configured to be positioned to, responsive to the door being in a closed position, hold the battery in place in the battery compartment and form an electrical connection between the battery across the battery contact and to at least a portion of an electrical circuit of the device, the battery contact being rotatably attached to the door such that responsive to the door being manipulated from an open position to the closed position, the battery contact pivots away from the door to a battery hold position.

10. The slidable battery door assembly of claim 9, wherein the battery contact is coupled to the door via a non-conductive means such that electrical contact is not made between the battery contact and the door.

11. The slidable battery door assembly of claim 10, wherein the non-conductive means comprises a non-conductive coating on a surface of the door to which the battery contact is attached.

12. The slidable battery door assembly of claim 9, wherein the door is configured to be manipulated from the open position to the closed position in response to a single user motion.

13. The slidable battery door assembly of claim 9, wherein the battery contact is coupled to the door through a channel in the surface of the battery compartment, the slidable battery door assembly being manipulable to slide along the channel to open and close the battery compartment.

14. The slidable battery door assembly of claim 9, wherein when the door transitions to the closed position, the battery contact pivots on a shaft to contact a surface of the battery such that the battery contact holds the battery in place in the battery compartment and connects the battery to the at least a portion of the electrical circuit of the device.

15. The slidable battery door assembly of claim 9, further comprising a latch configured to engage the battery contact to hold the slidable battery door assembly in the closed position, the latch being configured to be manipulated to release the battery contact such that the slidable battery door assembly transitions to the open position.

16. The slidable battery door assembly of claim 15, wherein the latch is configured to be manipulated in response to a user pressing a latch button that protrudes from a surface of the latch and through a perforation in a surface of the device.

17. A slidable battery door assembly for a device, comprising:
a door configured to be slidably manipulated to control access to a battery compartment of the device; and
a battery contact rotatably coupled to and separate from the door and positioned within the battery compartment such that when the door is manipulated to a closed position, the battery contact is configured to pivot away from the battery door and onto a surface of a battery to hold the battery in place within the battery compartment.

18. The slidable battery door assembly of claim 17, wherein when the door is manipulated to the closed position, the battery contact is further configured to connect the battery to at least a portion of an electrical circuit of the device.

19. The slidable battery door assembly of claim 17, wherein the door is configured to be manipulated to the closed position in response to a single user motion.

20. The slidable battery door assembly of claim 17, further comprising a latch configured to engage the battery contact to hold the slidable battery door assembly in the closed position, the latch being configured to be manipulated to release the battery contact such that the slidable battery door assembly transitions to an open position.

* * * * *